(12) United States Patent
Yoshida et al.

(10) Patent No.: US 8,671,296 B2
(45) Date of Patent: Mar. 11, 2014

(54) STORAGE CONTROL APPARATUS AND METHOD

(75) Inventors: Masahiro Yoshida, Kawasaki (JP); Tadashi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 12/820,734

(22) Filed: Jun. 22, 2010

(65) Prior Publication Data

US 2010/0332884 A1  Dec. 30, 2010

(30) Foreign Application Priority Data

Jun. 25, 2009  (JP) .................. 2009-150779

(51) Int. Cl.
*G06F 1/26* (2006.01)
(52) U.S. Cl.
USPC .......................................................... 713/320
(58) Field of Classification Search
USPC .................. 713/324, 320, 323, 300
See application file for complete search history.

(56) References Cited

U.S. PATENT DOCUMENTS

| 2004/0133707 | A1 | 7/2004 | Yoshiya et al. |
| 2008/0104431 | A1 | 5/2008 | Shimada |
| 2008/0126616 | A1 | 5/2008 | Kumasawa et al. |
| 2008/0151411 | A1* | 6/2008 | Yorimitsu ........................ 360/75 |
| 2008/0244290 | A1 | 10/2008 | Yoshida et al. |
| 2010/0082729 | A1* | 4/2010 | Shitomi ......................... 709/202 |

FOREIGN PATENT DOCUMENTS

| JP | 11-249826 | 9/1999 |
| JP | 2004-206623 | 7/2004 |
| JP | 2008-41050 | 2/2008 |
| JP | 2008-041050 | 2/2008 |
| JP | 2008-112292 | 5/2008 |
| JP | 2008-250945 | 10/2008 |
| JP | 2009-003831 | 1/2009 |

OTHER PUBLICATIONS

Japanese Office Action for corresponding Japanese Application 2009-150779; dated Apr. 26, 2011.

* cited by examiner

*Primary Examiner* — Kim Huynh
*Assistant Examiner* — Austin Hicks
(74) *Attorney, Agent, or Firm* — Staas & Halsey LLP

(57) ABSTRACT

A storage control apparatus includes a controller for receiving an access command from a host computer and controlling an access to a storage device and a monitoring period obtaining section for obtaining a monitoring period corresponding to the access command. The storage device is capable of operating in one of a power saving state and a normal state. The controller causes the storage device to return from the power-saving state to the normal state if the storage device corresponding to the access command is in the power saving state, and sends the host computer a response for preventing a timeout corresponding to the access command if the storage device have not yet returned to the normal state when the monitoring period elapses from receiving the access command.

10 Claims, 11 Drawing Sheets

FIG. 4

| HOST NO. | WWN | ABORT FLAG | ABORT TIME | CONTROL FLAG | LATEST RECORDING TIME |
|---|---|---|---|---|---|
| Host #0 | 2142000B5D6A5522 | Off | – | Off | – |
| Host #1 | 40580009AE390829 | On | 15 | On | 08/08/01 01:21:23 |
| Host #2 | 52E50045997512D1 | On | 30 | Off | 08/02/14 10:12:32 |
| ... | ... | ... | ... | ... | ... |

| TIME SERIES | HOST NO. | WWN | ABORT FLAG | ABORT TIME | CONTROL FLAG | LATEST RECORDING TIME |
|---|---|---|---|---|---|---|
| 1 | Host #0 | 2142000B5D6A5522 | Off | — | Off | — |
| 2 | Host #0 | 2142000B5D6A5522 | On | — | Off | — |
| 3 | Host #0 | 2142000B5D6A5522 | On | 20 | Off | — |
| 4 | Host #0 | 2142000B5D6A5522 | On | 20 | Off | 09/03/01 23:12:10 |
| 5 | Host #0 | 2142000B5D6A5522 | On | 20 | On | 09/03/01 23:12:10 |

STORAGE CONTROL APPARATUS AND METHOD

CROSS-REFERENCE TO RELATED APPLICATION

This application is based upon and claims the benefit of priority of the prior Japanese Patent Application No. 2009-150779, filed on Jun. 25, 2009, the entire contents of which are incorporated herein by reference.

FIELD

The embodiments discussed herein is relates to a storage system and a storage controlling method.

BACKGROUND

A large-scale storage device that manages and retains electronic mails and also manages and retains materials and documents in the form of electronic data is in great demand in order to promote computerization of business and to cope with regal regulations. As an existing large-scale storage device, a storage device of the type that a hard disk which is excellent in quick-responsiveness and is capable of handling mass data is installed is widely used.

In addition, recently, power saving of a storage device has been demanded in order to conserve global environment and to reduce the operational cost of a system. Therefore, such a power saving process as to turn off the motor of a disk (a hard disk drive) to which access is not gained for a fixed or more time period is executed on the disk. In this connection, a method of controlling to stop and start each disk by setting in advance conditions such as a minimum drive number indicative of a minimum number of disks to be driven, intervals at which the disks are re-started and others is proposed (see, for example, Japanese Laid-open Patent Publication No. 2008-41050). In addition, a method of predicting the future operating state of each disk on the basis of the operation history of the disk and controlling the operation of the disk so as to reduce the consumption power is proposed (see, for example, Japanese Laid-open Patent Publication No. 2008-250945). Likewise, a method of storing access order and access time for gaining access to each disk as history information and controlling to supply power and stop power supply to the disk on the basis of the history information is also proposed (see, for example, Japanese Laid-open Patent Publication No. 2008-112292)

In order to attain power saving operation of a storage device, it may be necessary to reduce the influence of the power saving operation on the operation of a system concerned by retaining the rapid-responsiveness to access to a disk concerned, in addition to the necessity to reduce the consumption power.

For example, in a storage device that configures an RAID (Redundant Arrays of Inexpensive Disks), power supply to one disk in the RAID configuration is stopped and only disks of the number necessary for access are driven. Owing to the above mentioned operations, power saving operation and rapid-responsiveness to sudden access are secured. As described above, in some cases, the rapid-responsiveness to access is retained by driving a predetermined minimum number of disks. However, a predetermined number of disks are usually in driven states regardless of the operational status of a system and hence such a problem may occur that sufficient effect is not obtained from the viewpoint of consumption power reduction.

On the other hand, in the case that the operation of the disk concerned is controlled by predicting its future operating state on the basis of history information on access to the disk, only the minimum necessary number of disks are driven conforming to the operational status of the system to promote power saving operation. A disk to which access will be possibly gained is started before access is actually gained to the disk by predicting the future possibility of access to the disk and hence the rapid-responsiveness to access may be retained. However, when access to a disk access to which is not predicted has occurred, driving of the disk concerned is started at that moment. Therefore, it sometimes occurs that responding to a host (a host device) is delayed and a response may not be returned to the host side within an access monitoring time (a time period for which access to a disk concerned is monitored).

In addition, in the worst case, there may be a possibility that a storage device is erroneously regarded to be abnormal and hence a path concerned is disconnected. When the path has been once disconnected, it may become impossible to use the path for a fixed time period and hence such a problem may occur that the operation of the system is adversely affected.

SUMMARY

According to an aspect of the invention, a storage control apparatus includes a controller for receiving an access command from a host computer and controlling an access to a storage device and a monitoring period obtaining section for obtaining a monitoring period corresponding to the access command, wherein the controller causes the storage device to return from a power-saving state to a normal state if the storage device corresponding to the access command is in the power saving state, and sends the host computer a response for preventing a timeout corresponding to the access command if the storage device have not yet returned to the normal state when the monitoring period elapses from receiving the access command.

According to another aspect of the invention, a method of controlling a power saving operation of a storage device, the method comprising receiving an access command from a host computer and controlling an access to the storage device, obtaining a monitoring period corresponding to the access command, causing the storage device to return from a power-saving state to a normal state if the storage device corresponding to the access command is in the power saving state, and sending the host computer a response for preventing a timeout corresponding to the access command if the storage device have not yet returned to the normal state when the monitoring period elapses from receiving the access command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of connected host information;

FIG. 5 is a diagram illustrating an example of a history of connected host information;

DESCRIPTION OF EMBODIMENTS

Preferred embodiments of the present invention will be described with reference to accompanying drawings.

Figure 1:
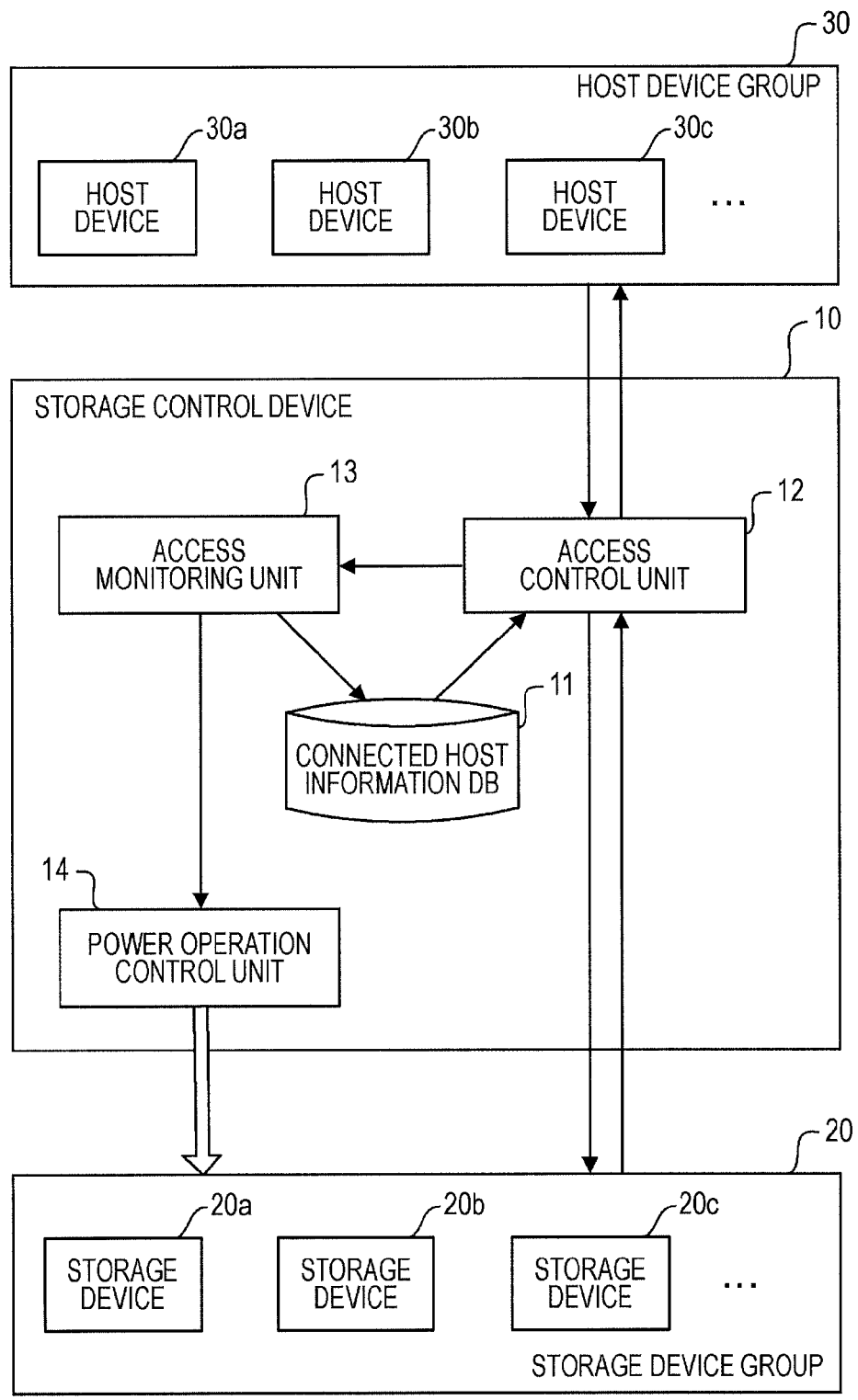
FIG. 1 is a diagram illustrating a configuration of a storage system according to a first embodiment.

FIG. 1 is a diagram illustrating a configuration of a storage system according to a first embodiment. A storage control device 10 is connected to a storage device group 20 and a host device group 30. The storage control device 10 controls access to the storage area of a storage device in the storage device group 20 on the basis of information on an access instruction (an access command for accessing data in the storage area) received from a host device in the host device group 30 and controls the storage device group 20 to perform power saving operation. In the example illustrated in the drawing, the power saving operation is operation in which the operating state of a storage device to which access is not gained for a fixed time period is shifted to a power-saving state.

The operating state of each of storage devices 20a, 20b and 20c included in the storage device group 20 is classified into a normal state (a normal mode) in which access to the storage area of each of the storage devices 20a, 20b and 20c is possible and a power-saving state (a power-saving mode) in which access to the storage area is not permitted and the storage device concerned is operated with reduced consumption power. The operating state of each of the storage devices 20a, 20b and 20c is switched to the normal state or the power-saving state in accordance with an instruction given from the storage control device 10. When the operating state of each storage device shifts from one state to another state, each storage device temporarily enters a transient state, that is, a transition state from the normal state to the power-saving state or a transition state from the power-saving state to the normal state.

Each of host devices 30a, 30b and 30c included in the host device group 30 sends an access request (an access command) to the storage area of one storage device included in the storage device group 20 in accordance with a request given by the execution of an application program in each of the host devices 30a, 30b and 30c. In the case that a response is not given from the storage device concerned even after an access monitoring time has elapsed from a time at which the access request has been transmitted to the storage area, an access abort instruction is given to abort the access request or a predetermined number of retrying operations are executed. In the case that any response is not given from the storage device concerned in spite of repetitive execution of the retrying operation, it is judged that abnormality has occurred in the storage device concerned and an access path (an access route) including the storage device concerned is disconnected.

Next, the storage control device 10 will be described. The storage control device 10 includes a host information database (hereinafter, referred to as a connected host information DB) 11, an access control unit (section) 12 for controlling access, an access monitoring unit (section) 13 for monitoring access and an operation control unit (section) 14 for controlling the operation of the storage device group 20. The access control unit (section) 12, the access monitoring unit (section) 13 and the power operation control unit (section) 14 are provided as functions of a processor, a memory and a computer program.

The connected host information on the host device 30a, 30b or 30c included in the host device group 30 which is connected to the storage control device 10 is stored in the connected host information DB 11. The connected host information is generated on the basis of the access instruction received from the host device 30a, 30b or 30c. For example, a network address of the host device 30a, 30b or 30c and an access abort period taken from when an access request has been given to the storage area concerned to when an instruction that access be aborted is given to abort the access request are included. These pieces of information are registered into the connected host information corresponding to identification information used for uniquely specifying the host device 30a, 30b or 30c. A time taken for responding to each host device is optimized on the basis of the connected host information so as to return a response before the access request is broken by the host device 30a, 30b or 30c.

In the case that the access instruction received from one host device included in the host device group 30 is an access request, the access control unit 12 confirms the operating state of the object storage device 20a, 20b or 20c to which the access request has been made. In the case that the object storage device 20a, 20b or 20c is in the power-saving state, the access control unit 12 instructs the operation control unit 14 to cancel the power-saving state of the object storage device 20a, 20b or 20c and to shift it to the normal state via the access monitoring unit 13. As an alternative, the access control unit 12 may directly instruct the operation control unit 14 to perform the above mentioned operations.

The access control unit 12 retrieves the connected host information DB 11, extracts the connected host information of the source host device from which the access request has been sent, reads the access abort time out of the connected host information and sets a response specified time (a specified time period within which a response is to be sent) on the basis of the access abort time. The response specified time is calculated by subtracting a predetermined margin time and a time taken for accessing to the storage device 20a, 20b or 20c from the access abort time. Then, when a time elapsed from reception of the access request is measured and then the operating state of the object storage device 20a, 20b or 20c is not shifted from the power-saving state to the normal state within the response specified time, a process of returning a dummy response indicating that the object storage device is in an in-process state is executed. The dummy response is returned before the access abort time set for the host device 30a, 30b or 30c expires. Owing to the above mentioned operation, the storage device concerned 20a, 20b or 20c is not regarded to be abnormal.

In the case that the access abort time is not used, the response specified time is set on the basis of a device response time necessary for shifting the operating state of the storage device 20a, 20b or 20c from the power-saving state to the normal state. When the device-response-time-based response specified time has expired, the storage device concerned 20a, 20b or 20c is regarded to be abnormal and a response indicative of occurrence of abnormality is returned to the host device 30a, 30b or 30c. Transition to the normal state may be postponed until an access abort instruction is obtained from the host device 30a, 30b or 30c and an access request which has been instructed may be processed.

The access monitoring unit 13 analyzes each piece of the access instructions received from each of the host devices 30a, 30b and 30c included in the host device group 30 and grasps the access status of each host device. Specifically, an access abort time taken from when the access request has been received from the host device 30a, 30b or 30c to when an access abort instruction is received is counted. For example, a time counter is operated at a moment that the access request has been received to count the time taken until the access abort instruction is received. As one alternative, a start time at which the access request has been received and an end time at with the access abort instruction has been received may be stored so as to obtain the access abort time from a difference between the start time and the end time. As another alternative, the number of retrying operations performed when an access request has not been successfully processed may be counted as necessary. Information relating to the access status including the counted access abort time is registered in the connected host information on the corresponding host device 30a, 30b or 30c and the connected host information which has been updated in the above mentioned manner is stored in the connected host information DB 11.

The operation control unit 14 controls the operating states of the plurality of storage devices 20a, 20b and 20c included in the storage device group 20 so as to make each storage device operate in one of the operating states of the normal state and the power-saving state. For example, the storage device 20a, 20b or 20c which has not been accessed for a predetermined time is detected to switch the operating state of the detected storage device from the normal state to the power-saving state. Switching from the power-saving state to the normal state is executed in accordance with an instruction from the access control unit 12 or the access monitoring unit 13. State switching is performed on the storage device 20a, 20b or 20c which is predicted to be accessed next on the basis of its access history in which ever performed accessing operations are recorded. Incidentally, control of operating state switching other than switching which is executed in accordance with the instruction from the access control unit 12 or the access monitoring unit 13 may be executed in accordance with a schedule which has been set in accordance with a situation in which access is executed.

The operation of the storage control device 10 which is configured as mentioned above and a method of controlling the operation of the storage control device will be described. Next, a case in which a request that access be gained to the storage area of the storage device 20a has been received from the host device 30a will be described by way of example.

In the case that the access instruction which has been received from the host device 30a is an access request, the access control unit 12 checks the operating state of the object storage device 20a. When the operating state of the object storage device 20a is the normal state, the access control unit 12 executes an accessing process as requested and returns a response to the host device 30a.

On the other hand, when the operating state of the object storage device 20a is the power-saving state, the access control unit 12 invalidates the power-saving state of the object storage device 20a and outputs an instruction that the operating state of the storage device 20a be shifted to the normal state to the operation control unit 14 via the access monitoring unit 13. The operation control unit 14 shifts the operating state of the object storage device 20a to the normal state in accordance with the instruction. The access monitoring unit 13 stores therein a time at which the access request has been received. As an alternative, counting may be started using a counter. In the case that an access abort instruction has been received from the host device 30a before the operating state of the object storage device 20a is shifted to the normal state, the access control unit 12 controls to abort the accessing process. The access monitoring unit 13 calculates an access abort time for the host device 30a on the basis of a time at which the access abort instruction has been received and the previously stored access request received time and registers the calculated access abort time into the connected host information corresponding to the host device 30a. In the above mentioned manner, the access abort time is set in the connected host information. Incidentally, in the case that the object storage device 20a enters the normal state before the access abort instruction is received, the access monitoring unit 13 executes the accessing process as requested and returns a response to the host device 30a.

After the access abort time has been set in the connected host information in the above mentioned manner, a dummy response process is executed on the basis of the response specified time which has been set in accordance with the access abort time. In the case that the access instruction which has been received from the host device 30a is the access request as in the case in the above mentioned situation, the access control unit 12 checks the operating state of the object storage device 20a. In the case that the operating state of the object storage device 20a is the power-saving state, the access control unit 12 outputs an instruction that the state be shifted to the normal state to the operation control unit 14. The operation control unit 14 then invalidates the power-saving state of the object storage device 20a and shifts it to the normal state as instructed. The access monitoring unit 13 then starts counting of the access abort time in the same manner as the above. In counting the access abort time, the access control unit 12 extracts the connected host information of the host device 30a which is the source from which the access request has been given from the connected host information DB 11 and reads the access abort time out of the information to set a response specified time. As described above, the response specified time which is set in the above mentioned situation is set shorter than the access abort time. Then, in the case that the object storage device 20a has not entered the normal state even after the response specified time has elapsed from a moment at which the access request has been received, a predetermined response is returned to the host device 30a as the request source. For example, a response that retry be requested is returned to the host device 30a. The host device 30a which has received the response does not regard the object storage device 20a to be abnormal and tries again to send an access request after a fixed time has elapsed.

Incidentally, it may sometimes occur that for reasons of reduction of an access monitoring time of the host device 30a or other reasons, an access abort instruction is received before the response specified time expires. In the above mentioned case, the access abort time is again counted on the basis of the time at which the access abort instruction has been received and is again set in the connected host information of the host device 30a. In the above mentioned manner, the access abort time is usually updated to the latest value conforming to the current status of the host device 30a. In addition, the response specified time which is set on the basis of the access abort time is dynamically calculated to be optimized conforming to the current status of the host device 30a.

With the use of the storage control device 10 that executes the processes as described above, the access abort time is counted on the basis of the access instruction from the host device and is set in the connected host information. In the case that a rise time at which the operating state of the object storage device is shifted from the power-saving state to the normal state is delayed, the dummy response process is executed on the basis of the response specified time conforming to the access abort time. Therefore, it may become possible to return a response to the host device before the host device regards the object storage device to be abnormal and gives the instruction that access be broken. As a result, occurrence of such a serious situation that the operation of the system is adversely affected for reasons that the host device erroneously judges that abnormality has occurred in the object storage device and disconnects the path including the object storage device may be avoided. In addition, the necessity to hold unnecessary storage devices on in order to retain the quick-responsiveness is eliminated and hence the power saving operation may be efficiently performed.

Next, a case in which the invention is applied to a storage system including a disk array device will be described as a second embodiment. The disk array device turns on the motor of a disk which is in the normal state and turns off the motor of a disk to which access is not gained for a time period exceeding a predetermined time period to save power. In general, a rise time from several ten seconds to several minutes is necessary in order to turn on the motor of a disk which is in a turned-off state. In some cases, the rise time of the motor may become shorter than the access abort time depending on the access monitoring time which is set on the side of the host device, which may adversely affect the operation of the system.

Figure 2:
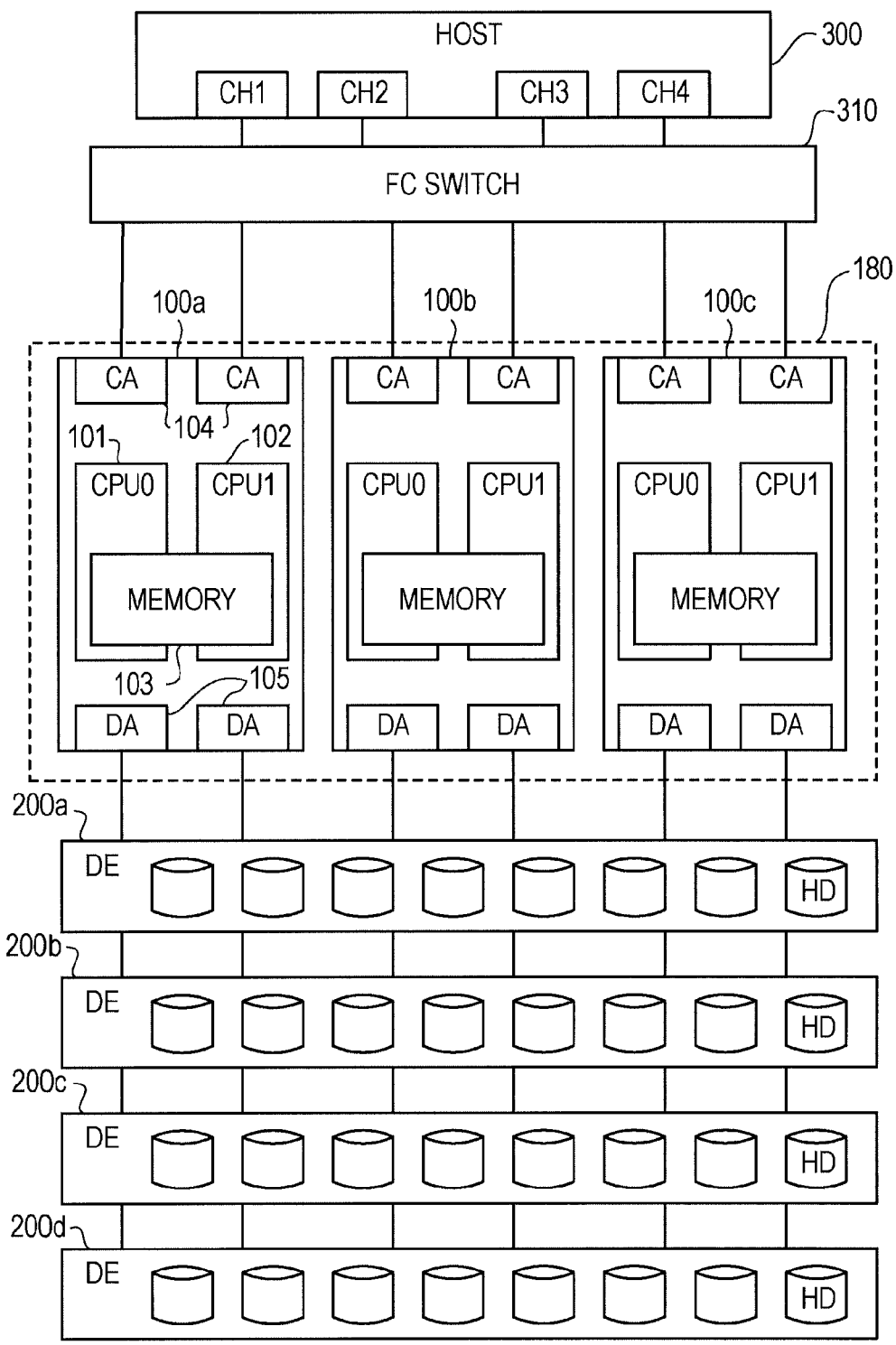
FIG. 2 is a diagram illustrating a configuration of a disk storage system according to a second embodiment.

FIG. 2 is a diagram illustrating a configuration of a disk system according to the second embodiment.

The disk system includes a host computer HOST (hereinafter, referred to as a host) 300, CMs (Controller Modules) 100a, 100b and 100c which are controller modules for controlling operations of disks and DEs (Disk Enclosures) 200a, 200b and 200c which are disk enclosures for respectively packaging disk array groups.

Incidentally, the host 300 represents the host device group which is connected with the CMs 100a, 100b and 100c. The host 300 transmits an I/O command as the access instruction to instruct to execute an I/O process of inputting data into and/or outputting data from the storage area of a disk concerned in a disk array. In the case that any response is not given even after the access monitoring time has elapsed, the host 300 transmits an abort instruction command which is given in order to abort execution of the above mentioned I/O process.

The CMs 100a, 100b and 100c are packaged into a controller enclosure CE (Controller Enclosure) 180. The CMs 100a, 100b and 100c function as storage control devices.

Each of the disk arrays which are packaged into the DEs 200a, 200b and 200c is of a RAID configuration designed to have redundancy. The operating state of each disk packaged into the DEs 200a, 200b, 200c or 200d is switched to an "on" or "off" state in accordance with an access execution status (whether access is gained to the disk concerned). The "on" state indicates a normal state in which its motor is being operated and hence execution of the I/O process is possible. The "off" state indicates a power-saving state in which the operation of its motor is stopped and hence execution of the I/O process is impossible. As transitional operating states, an "in-on-process" state in which the operating state is shifting from the "off" state to the "on" state and an "in-off-process" state in which the operating state is shifting from the "on" state to the "off" state are given.

In the example illustrated in the drawing, the general operation of the CM 100a is controlled using a CPU (Central Processing Unit) 0(101) and a CPU 1(102). A memory 103, channel adapters CAs 104 and disk adapters DAs 105 are connected with the CPU 0(101) and the CPU 1(102) via an internal bus. At least part of programs to be executed using the CPU 0(101) and the CPU 1(102) is temporarily stored in the memory 103. The memory 103 is shared by the CU 0(101) and the CPU 1(102) and stores various pieces of data necessary for execution of processes using the CPU 0(101) and the CPU 1(102). The CAs 104 are connected with an FC switch 310 and are then connected with channels CH1, CH2, CH3 and CH4 of the host 300 via the FC switch 310 to establish a path. Data transmission and reception is performed between the host 300 and the CPU 0(101) and the CPU 1(102) via the path so established. The DAs 105 are connected with the external DEs 200a, 200b, 200c and 200d. The CPU 0(101) and the CPU 1(102) transmit data to the external DEs 200a, 200b, 200c and 200d and receive data from the DEs via the DAs 105.

Hardware configurations of the CMs 100b and 100c are the same as that of the CM 100a. The hardware configurations of the CMs make it possible to implement processing functions of the CMs 100a, 100b and 100c.

Figure 3:
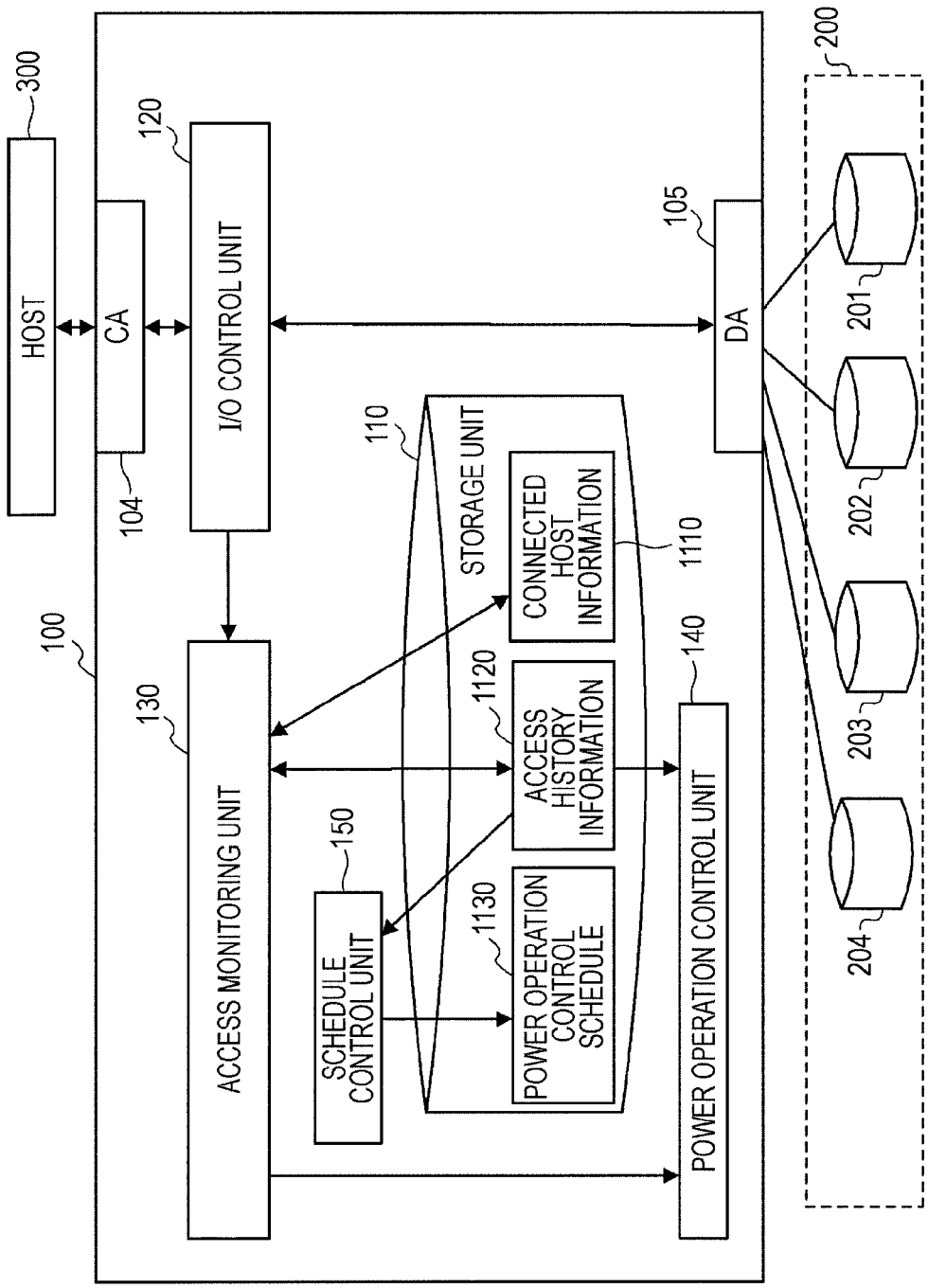
FIG. 3 is a diagram illustrating an example of a software configuration of a CM.

FIG. 3 is a diagram illustrating an example of a software configuration of a CM. In FIG. 3, the same numerals are assigned to the same parts in FIG. 2 and description thereof will be omitted. Incidentally, the CM 100 represents the CMs 100a, 100b and 100c and the DE 200 represents the DEs 200a, 200b and 200c.

The CM 100 includes a storage unit 110 that stores various pieces of information, an I/O control unit (section) 120 that processes an I/O request sent from the host 300, an access monitoring unit (section) 130 that monitors an access status, a power operation control unit power operation control unit (section) 140 that controls the operation of the DE 200 and a schedule control unit (section) 150 that manages the schedule of the operation of the DE 200.

Various pieces of information such as connected host information 1110, access history information 1120 and a power operation control schedule 1130 are stored in the storage unit 110. Information on the access status of a host concerned which is obtained by analyzing the access instruction received from the host which is connected with the CM 100 is set in the connected host information 1110. The connected host information 1110 will be described in detail later. History information relating to the access instruction received from the host concerned is set in the access history information 1120. A schedule used to perform power saving operation is set in the power operation control schedule 1130.

The I/O control unit 120 implements an access processing function of the access control unit 12. The I/O control unit 120 receives the I/O request from the host 300 to perform I/O control (to control to input/output data).

The access monitoring unit 130 operates as the access control unit 13 and implements the dummy response process which is to be performed using the access control unit 12. The access monitoring unit 130 instructs the power operation control unit power operation control unit 140 to turn on motors of hard disks 201, 202, 203 and 204 installed in the DE 200 corresponding to the RAID group as an access object (an object to be accessed) in accordance with an access request from the host 300 and then monitors the operating states of motors turning-on of which has been instructed. In the case that the motors do not enter turned on states even when a response specified time has expired, the access monitoring unit 130 returns the host 300 a response notifying that an object disk is now in the "in-on-process" state such that the host 300 may not erroneously judge that abnormality has occurred in the object disk.

The power operation control unit power operation control unit 140 operates as the operation control unit 14. That is, the power operation control unit 140 controls to turn on/off the motor of the object disk for power saving on the basis of the status of access to the disks 201, 202, 203 and 204 and the power operation control schedule 1130. Specifically the power operation control unit 140 controls to turn off the motor of a disk which has been found not to be operated for a fixed time period on the basis of the access history information 1120. In addition, the power operation control unit 140 also performs motor-turning-on control conforming to a suddenly given access request in accordance with an instruction from the access monitoring unit 130. Incidentally, a motor control response may be transmitted to a processing unit from which motor-turning-on/off control has been requested at the completion of execution of motor-turning-on/off control. The above mentioned motor control response is sent in order to notify the processing unit concerned of information as to whether motor-turning-on/off control has been normally terminated.

The schedule control unit 150 manages and updates the power operation control schedule 1130 used to control to turn on/off the motor of the disk 201, 202, 203 or 204 in the DE 200. That is, the schedule control unit 150 prepares the power operation control schedule 1130 which is optimized by reflecting therein the operational state of the system which is operated on the basis of a schedule which is specified by a user and the access history information 1120. A method of optimizing a schedule is disclosed in, for example, U.S. Patent Application Publication No. 20008/0244290 which is incorporated herein by reference.

Next, the connected host information 1110 and a process of setting it will be described.

FIG. 4 is a diagram illustrating an example of connected host information. The connected host information 1110 has information items such as Host No. 1111, WWN (World Wide Name) 1112, Abort Flag 1113, Abort Time 1114, Control Flag 1115 and Latest Recording Time 1116.

The host No. 1111 is a serial number assigned to each host to be managed using the CM 100.

The WWN 1112 is a 64-bit address with which each device in a fiber channel network is uniquely identified. WWN makes it possible to uniquely identify a host which has transmitted a command concerned.

The abort flag 1113 indicates information as to whether an abort instruction command (a command that aborting of an access request be instructed) has been accepted from a host concerned. "Off" indicates that any abort instruction command is not accepted. "On" indicates that the abort instruction command has been accepted.

The abort time 1114 is counted when the abort instruction command has been accepted. The time taken from when an I/O command has been received to when an abort instruction command is received is counted as the abort time. In the case that any abort instruction command is not accepted, an invalid value is set in the column concerned.

The control flag 1115 indicates a state of controlling to reduce a response time of a response to a host concerned. In the example illustrated in the drawing, whether a dummy response process is necessary is indicated. In the case that the operating state of a disk of an access request destination (a destination to which an access request is made) is the "off" state, returning of a response to the host concerned is not allowed until a motor-turning-on process is executed to turn on the motor of the disk concerned so as to shift the operating state of the object disk to the "on" state. A time taken from when the operating state of the disk concerned has shifted from the "off" state to the "on" state to when returning of a response to the host concerned is made possible is inherent to each device and is called a device response time. Whether execution of a dummy response process is necessary (On)/ unnecessary (Off) is determined by comparing the device response time with an abort time taken until the host side aborts an access request. In the case that the abort time is longer than the device response time, a response to the access request may be returned to the host concerned before the abort instruction command is given. Therefore, it is not necessary to reduce the response time and hence "Off" is set in the column concerned. On the other hand, in the case that the abort time is shorter than the device response time, a response to the access request may not be returned to the host concerned before the abort instruction command is given. Thus, execution of the dummy response process is necessary and "On" is set in the column concerned.

The latest recording time 1116 indicates a time at which an abort instruction command has been finally accepted. For the host having the host number 1111 indicated by "Host #0" in the connected host information 1110, the abort time is not detected and hence it is set that the dummy response process is not applied to the host. For the host having the host number 1111 indicated by "Host #1", the abort time is detected. In the above mentioned case, since the device response time (for example, it is assumed to be 20 seconds) is longer than the abort time (15 seconds) which has been counted in the above mentioned situation, an abort instruction command may be possibly generated before execution of the I/O process becomes possible. Thus, "On" is set in its column of the control flag 1115. "On" indicates that the dummy response process is applied to the host. For the host having the host number 1111 indicated by "Host #2", the abort time is detected. The device response time (20 seconds) is shorter than the abort time (30 seconds) which has been counted in the above mentioned situation, so that there is almost no possibility that the abort instruction command is generated before execution of the I/O process becomes possible. Thus, "Off" is set in its column of the control flag 1115. "Off" indicates that the dummy response process is not applied to the host.

FIG. 5 is a diagram illustrating an example of a history of the connected host information. FIG. 5 illustrates an updating status of the connected host information 1110 on the host having the host number indicated by "Host #0". Only the latest information is set in the actual connected host information 1110.

Time Series indicates elapsed times. The history indicates that the larger the value is, the later the time at which the connected host information has been obtained is. At a time point of the time series "1", it is indicated that "the abort time is not detected" and "the dummy response process dummy response process is not applied" have been set for the host "Host #0". This state (Abort Flag=Off, Abort Time=Invalid Value, Control Flag=Off, Latest Recording Time=Invalid Value) is the same as that attained upon initialization. In the case that one host of a connection destination has been replaced with another host, information items which come after the item of the host number of the host replaced by another host are initialized.

When an abort instruction command is received from the host indicated by "Host #0", the state shifts to the time series "2" state. As a result of detection of the abort instruction command, the abort flag is switched from "Off" to "On".

The access monitoring unit 130 calculates the abort time from when an I/O command corresponding to the received abort instruction command has been accepted to when the abort instruction command has been received. The calculated abort time is registered in the column for the abort time and the state shifts to the time series "3" state. In the time series "3" state, the abort time of "20 seconds" is detected and registered in the column for the abort time.

Next, a time at which the abort instruction command detected in the time series "2" state has been accepted is registered in the column for the latest recording time and the state shifts to the time series "4" state.

Then, the abort time is compared with the device response time. In the case that the abort time is shorter than the device response time, "On" is set in the column for the control flag. In the case that the abort time is longer than the device response time, "Off" is set in the column for the control flag. In the example illustrated in the drawing, in the case that the device response time is 25 seconds, the abort time (20 seconds) is shorter than the device response time and hence "On" is set in the column for the control flag and the state shifts to the time series "5" state.

As described above, in the case that an abort instruction command has been detected, related information in the connected host information is updated. In the case setting of the device response time has been changed, confirmation of control flags of all the host numbers and a setting changing process are executed.

Next, the operation of the CM 100 and control of turning on/off the motors of disks will be described.

In the CM 100, the power operation control unit 140 controls to turn on/off the motors of the disks 201, 202, 203 and 204 on the basis of the power operation control schedule which has been set using the schedule control unit 150. In the case that access is not gained to the motor of a disk concerned for a fixed or more time period, the motor of the disk concerned is turned off for power saving. In the case that the operating state of a disk access to which is predicted is the "off" state, the motor of the disk concerned is turned on to shift the operating state of the disk concerned to the "on" state on the basis of prediction for access.

Next, the operation to be performed when an I/O command has been received from the host 300 while power saving operation is being performed will be described. When the I/O command has been received, the operating states of the disks included in the object RAID group are either the "on" states or the "off" states. A case in which the operating state of the disk concerned is the "on" state when the I/O command has been received from the host 300 is defined as a case 1.

In the case that the operating state of the object disk is the "off" state, control to turn on the motor of the object disk is executed. In the above mentioned case, the operation to be executed when the device response time is longer than the abort time is different from that when the device response time is shorter than the abort time. A case in which the operating state of the disk concerned is the "off" state and the device response time is shorter than the abort time when the I/O command has been received is defined as a case 2.

In the case that the device response time is longer than the abort time, the operation to be executed when the abort time is not detected is different from that when the abort time is detected. The former case is defined as a case 3 and the latter case is defined as a case 4.

Next, the respective cases will be described.

[Case 1] A case in which the operating state of the object disk is the "on" state This is the case in which the motors of the disks included in the object RAID group are turned on and access to the disks is made possible before the I/O command is received from the host 300.

In the above mentioned case, it is possible for the I/O control unit 120 to immediately execute the I/O process on the object disk. Then, after execution of the I/O process, the I/O control unit 120 transmits a response to the host 300. The host 300 receives the response and judges that execution of the I/O process has been normally terminated.

Figure 6:
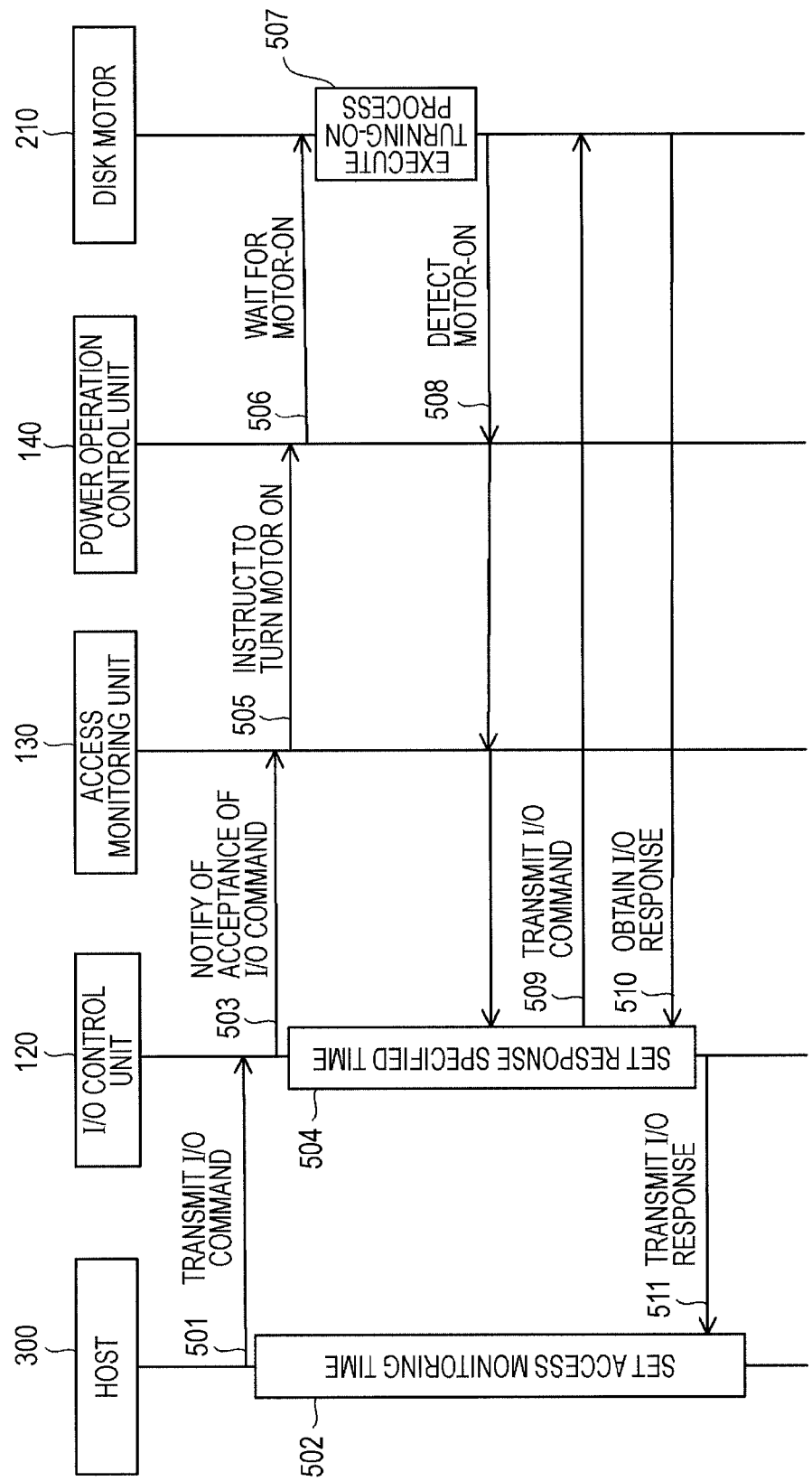
FIG. 6 is a diagram illustrating a flow of processing executed using a CM in a case 2.

[Case 2] A case in which the operating state of the object disk is the "off" state and the device response time is shorter than the abort time FIG. 6 is a diagram illustrating a flow of processing executed using the CM in the case 2.

The host 300 transmits an I/O command to the object RAID group (501). The host 300 sets an access monitoring time and waits for a response (502). The access monitoring time is counted as an access abort time in the CM 100. In the case that any response is not given even after the access monitoring time has elapsed, the host 300 issues an abort instruction command.

The I/O command is processed using the I/O control unit 120. The I/O control unit 120 notifies the access monitoring unit 130 of acceptance of the I/O command (503). The I/O control unit 120 sets a response specified time and waits for a response (504). In the case that the control flag of the corresponding host set in the connected host information 1110 is "On", the response specified time is set on the basis of the abort time of the corresponding host. In the case that the control flag is "Off", the response specified time is set on the basis of the device response time. As an alternative, a predetermined set value may be used as the response specified time. In the case 2, the response specified time is set on the basis of the device response time. The access monitoring unit 130 outputs a motor-on instruction that the disk motor 210 of the object disk be turned on to the power operation control unit 140 (505). In addition, the access monitoring unit 130 starts counting of a time which has elapsed from acceptance of the I/O command. The power operation control unit 140 starts control of turning on the object disk motor 210 on the basis of the motor-on instruction (505) and waits until the disk motor 210 is turned on (506). A turning-on process for returning the operating state of the disk motor 210 to the "on" state is executed on the disk motor 210 (507). In the example illustrated in the drawing, it is assumed that turning-on of the disk motor has been successfully attained within the response specified time. A notification that the disk motor 210 has been turned on and hence execution of the I/O process on the object RAID group is made possible is sent to respective processing units via the power operation control unit 140 (508).

The I/O control unit 120 which has detected that the operating state of the disk motor 210 has been shifted to the "on" state executes an accessing process and transmits the I/O command to the disk motor 210 (509). The disk motor 210 is in the turned-on state and hence the object disk is in the operating state, so that an I/O response (a response to the I/O command) is immediately obtained from the disk motor 210 (510). The I/O control unit 120 transmits the I/O response to the host 300 (511) to terminate the process. Incidentally, counting of the elapsed time using the access monitoring 130 is stopped.

As described above, in the case that the motor of the object disk has been turned on within the response specified time, the process concerned is executed after the motor has been turned on and an access response (a response that access to the object motor has been successfully made) is returned to the host 300. Although the access time is longer than that taken for usual access (the case 1), normal termination of the operation is possible.

Figure 7:
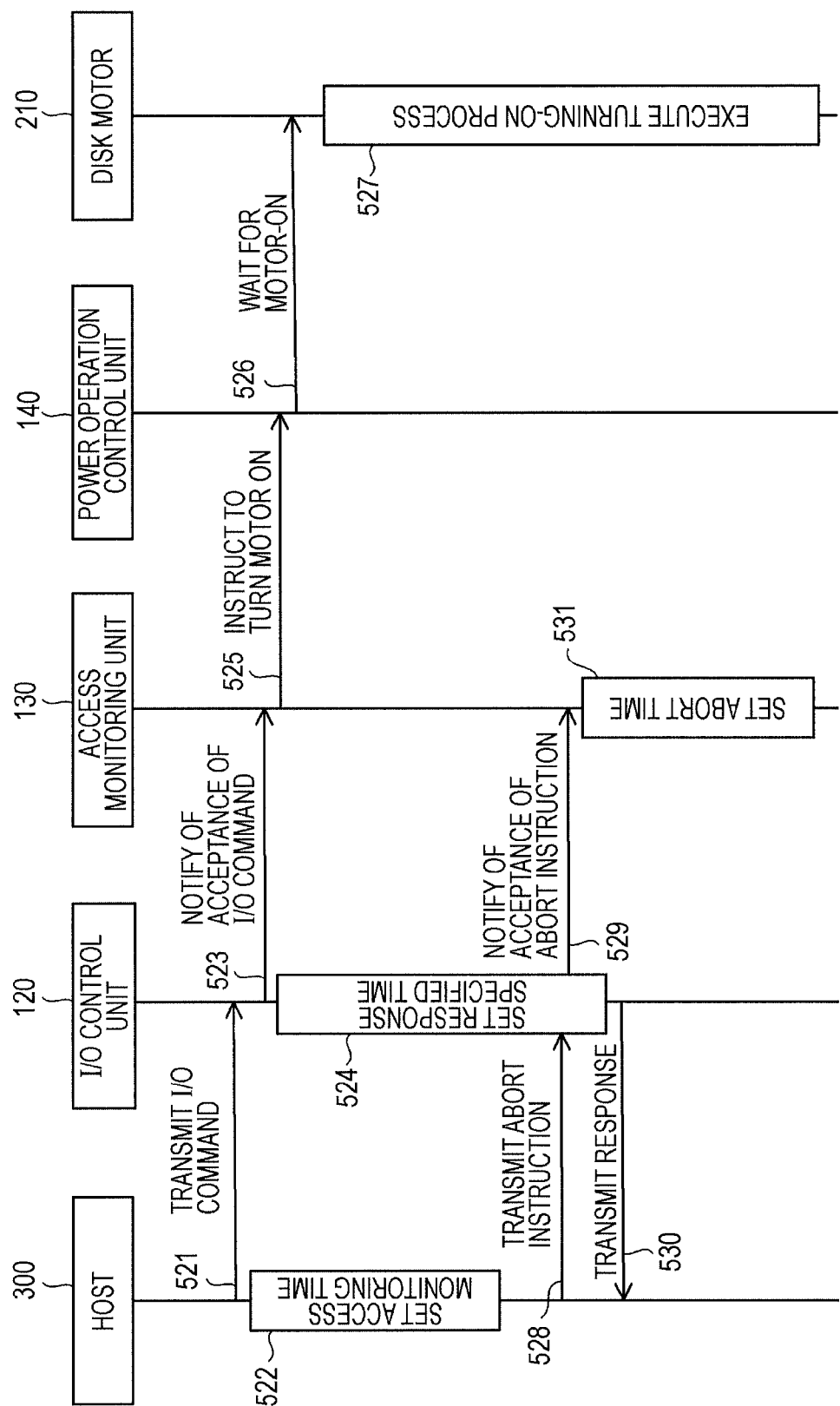
FIG. 7 is a diagram illustrating a flow of processing executed using a CM in a case 3.

[Case 3] A case in which the operating state of the object disk is the "off" state, the device response time is longer the abort time and the abort time is not detected FIG. 7 is a diagram illustrating a flow of processing executed using the CM in the case 3.

The host 300 transmits an I/O command to the object RAID group (521). In addition, the host 300 sets an access monitoring time and waits for a response (522).

The I/O command is processed using the I/O control unit 120. The I/O control unit 120 notifies the access monitoring unit 130 of acceptance of the I/O command (523). In addition, the I/O control unit 120 sets a response specified time and waits for a response (524). In the above mentioned case, the control flag in the host connection information 1110 is "Off", so that the response specified time is set on the basis of the device response time. Any dummy response process is not applied to, so that a response that the object motor is in the in-on-process state is not returned to the I/O control unit 120 even when the response specified time has expired. The access monitoring unit 130 outputs a motor-on instruction that the disk motor 210 of the object disk be turned on to the power operation control unit 140 (525). In addition, the access monitoring unit 130 starts counting of a time elapsed from acceptance of the I/O command. The power operation control unit 140 starts control of turning-on the disk motor 210 of the object disk on the basis of the motor-on instruction (525) and waits until the motor is turned on (526). A turning-on process is executed on the disk motor 210 to shift the operating state of the motor to the "on" state, thereby returning the operating state of the disk to the "on" state (527). In the case 3, the device response time necessary for executing the turning-on process is longer than the abort time.

Any response is not given even when the access monitoring time has elapsed, so that the host 300 transmits an abort instruction command that the access request be aborted to the object RAID group from which any response is not given (528).

The abort instruction command is processed using the I/O control unit 120 and the I/O control unit 120 sends the access monitoring unit 130 a notification that the abort instruction command has been accepted (529). In addition, the I/O control unit 120 transmits a response to the abort instruction command to the host 300 (530). The access monitoring unit 130 which has received the notification that the abort instruction command has been accepted calculates an abort interrupted time on the basis of the elapsed time which has been counted from a time at which the I/O command has been accepted and sets the calculated abort interrupted time in the connected host information 1110 (531). Incidentally, although the access to the object disk is broken, the turning-on process is continuously executed on the disk motor 210 (527).

As described above, before the abort time is counted, the abort instruction command is temporarily generated. However, the succeeding processes are executed in accordance with the procedure of the case 4 which will be described later, so that the abort instruction command will not be repetitively generated. That is, when the host 300 once executes a retrying process in response to the abort instruction command, the abort instruction command will not be generated again.

Figure 8:
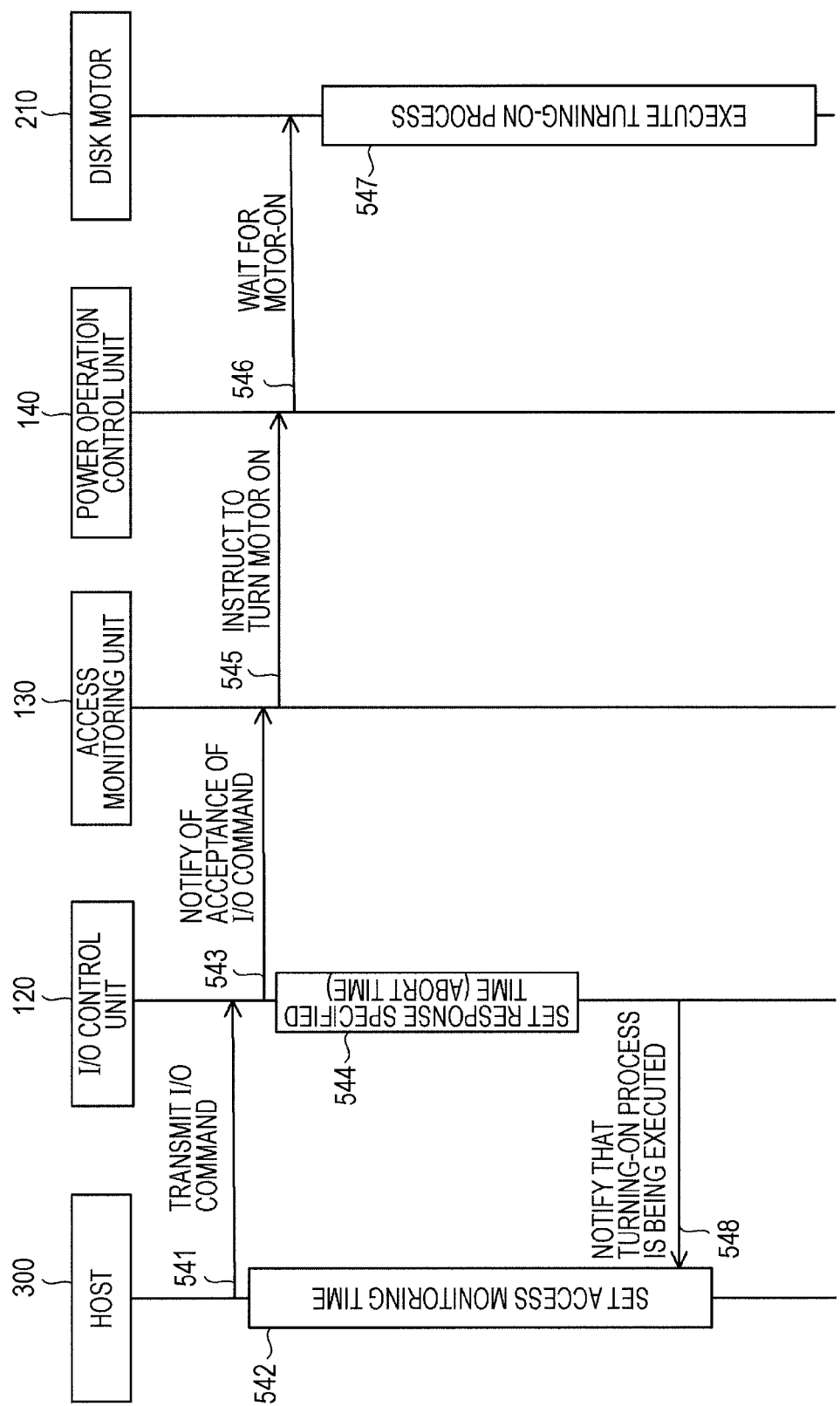
FIG. 8 is a diagram illustrating a flow of processing executed using a CM in a case 4.

[Case 4] A case in which the operating state of the object disk is the "off" state, the device response time is longer than the abort time and the abort time is detected FIG. 8 is a diagram illustrating a flow of processes executed using the CM in the case 4.

The host 300 transmits an I/O command to the object RAID group (541). In addition, the host 300 sets an access monitoring time and waits for a response from the object RAID group (542).

The I/O command is processed using the I/O control unit 120. In the case that the operating state of the object disk is the "off" state, the I/O control unit 120 sends the access monitoring unit 130 a notification that the I/O command has been accepted (543). Since the abort time is detected, the I/O control unit 120 sets the response specified time on the basis of the abort time and waits for a response (544). The access monitoring unit 130 outputs a motor-on instruction that the disk motor 210 of the object disk be turned on to the power operation control unit 140 (545) and starts counting of a time elapsed from acceptance of the I/O request. The power operation control unit 140 starts control of turning-on the object disk motor 210 on the basis of the motor-on instruction (545) and waits until the motor is turned on (546). The disk motor 210 is subjected to a turning-on process to shift the operating state of the motor to the "on" state so as to return the operating state of the disk to the "on" state (547). In the case 4, the time necessary to execute the turning-on process (547) is longer than the abort time. However, since the response specified time is set to be shorter than the abort time on the basis of the abort time, the I/O control unit 120 detects that the response specified time has elapsed from a moment at which the access request has been received earlier than the abort time. Then, the I/O control unit 120 sends the host 300 a response that the turning-on process is being executed on the motor concerned (548). Incidentally, the turning-on process is continuously executed on the disk motor 210.

Owing to the above mentioned operations, returning of the response to the host 300 is made possible before the host 300 aborts the access request on the basis of the counted abort interrupted time. Accordingly, the host 300 is then allowed to execute a retrying process without erroneously regarding the object RAID group to be abnormal. In execution of the retrying process, the I/O command transmitting process (541) and succeeding processes are again executed. In the above mentioned situation, in the case that the disk motor 210 of the object motor is not turned on, the processes are executed in accordance with the procedure of the case 4 in FIG. 8. The above mentioned processes are repetitively executed until the disk motor 210 of the object disk is turned on. In the case that the disk motor 210 of the object motor is turned on, the I/O process is executed in the same manner as that in the case 2 illustrated in FIG. 6.

As described above, dynamic optimization of the accessing process is made possible by managing the access response time relative to the disk which operates in the power-saving state conforming to the access status (to which disk the host has sent an access command) of the host as the access request source. Optimization of the accessing process makes it possible to return the response before the access request given from the host is broken. As a result, such a situation may be avoided that the object disk is erroneously regarded to be abnormal to adversely affect the operation of the system.

Next, the procedure of a method of controlling operations of the CMs and the disks in the above mentioned disk system will be described with reference to a flowchart.

Figure 9:
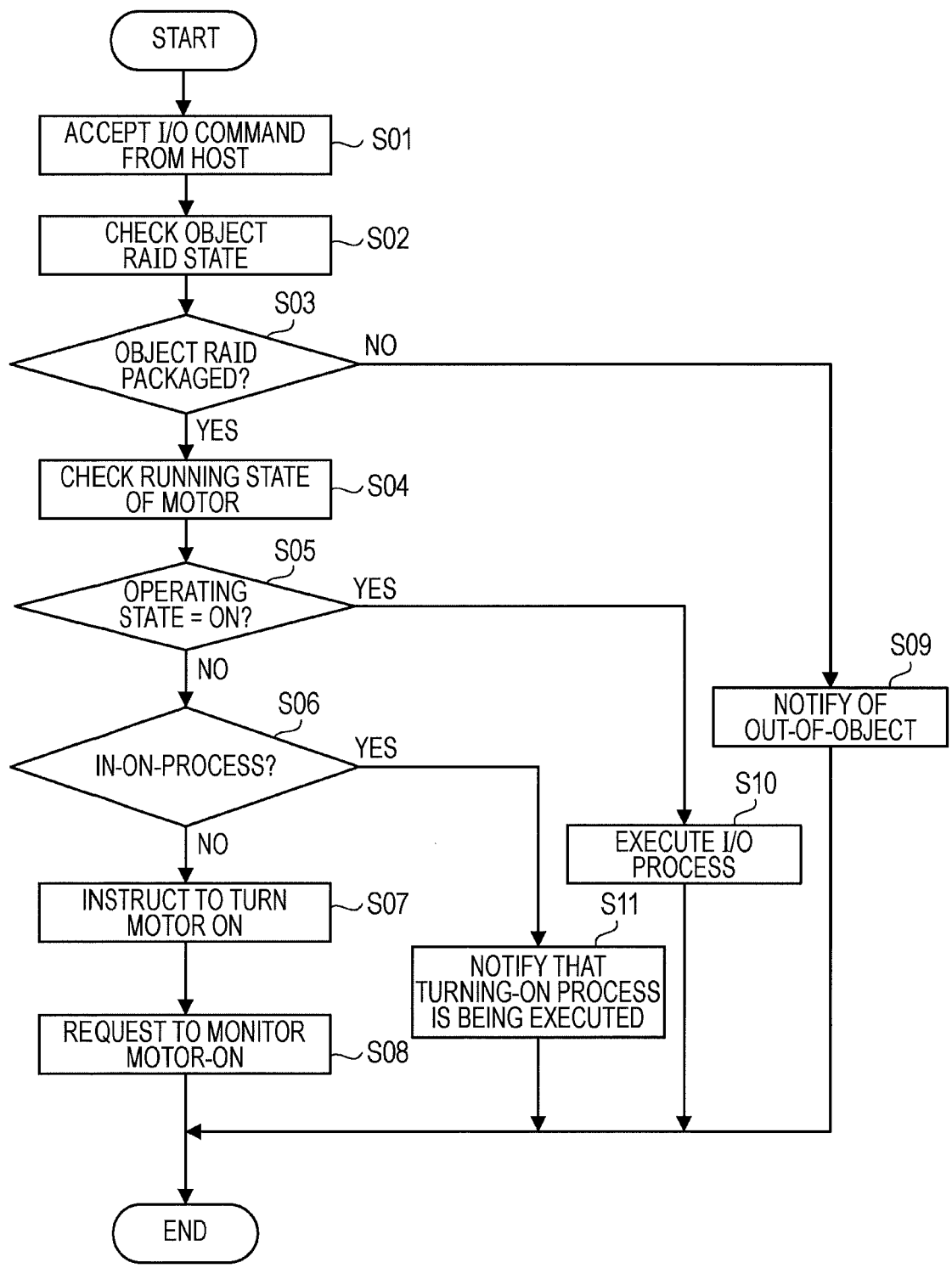
FIG. 9 is a flowchart illustrating an I/O procedure executed when an I/O command has been accepted from a host.

FIG. 9 is a flowchart illustrating the procedure of an I/O process to be executed when an I/O command has been accepted from a host.

Execution of the process is started by accepting the I/O command transmitted from the host 300.

[S01] The I/O control unit 120 accepts the I/O command transmitted from the host 300. Information indicative of the storage area of an object disk and the details of the I/O process are described in the I/O command.

[S02] The packaging state and the operating state of an object RAID group which is specified on the basis of the I/O command which has been acquired at S01 are checked.

[S03] Whether the object RAID group is packaged is judged on the basis of a result of checking executed at S02. In the case that it has been judged that the RAID group is packaged, the process proceeds to S04. In the case that it has been judged that the RAID group is not packaged, the process proceeds to S09.

[S04] In the case that it has been judged that the object RAID group is packaged, running states of the motors of disks included in the object RAID group are checked.

[S05] Whether the motor of an object disk runs, that is, the operating state of the motor is the "on" state is judged on the basis of a result checking on the running states of the motors executed at S04. In the case that the operating state of the motor is not the "on" state, the process proceeds to S06. In the case that the operating state of the motor is the "on" state, the process proceeds to S10.

[S06] In the case that the operating state of the motor of the object disk is the "in-on-process" state in which a motor turning-on process is being executed on the motor, the process proceeds to S11. In the case that operating state of the motor of the object disk is not the "in-on-process" state, the process proceeds to S07.

[S07] In the case that the operating state of the motor of the object disk is neither the "on" state nor the "in-on-process" state, an instruction that the disk motor of the object disk be turned on is output to the power operation control unit 140.

[S08] Monitoring of the process of turning on the disk motor is requested to a process routine that monitors the operating state of the disk motor concerned and execution of the process is terminated. Details of a process of monitoring turning-on of the motor concerned will be described later.

[S09] In the case that it has been judged that the object RAID group is not packaged, a notification that the RAID group is out of object is sent to the host 300 and execution of the process is terminated.

[S10] In the case that the operating state of the motor of the object disk is the "on" state, the I/O process is executed on the object disk on the basis of the I/O command which has been received from the host and execution of the process is terminated. A result of execution of the I/O process is returned to the host 300 as a response.

[S11] A notification that the turning-on process is being executed on the motor of the object disk is sent to the host 300 and execution of the process is terminated. The host 300 which has received the notification is allowed to execute the retrying process.

Next, the process of monitoring turning-on of the motor concerned will be described with reference to FIG. 10 and FIG. 11.

Figure 10:
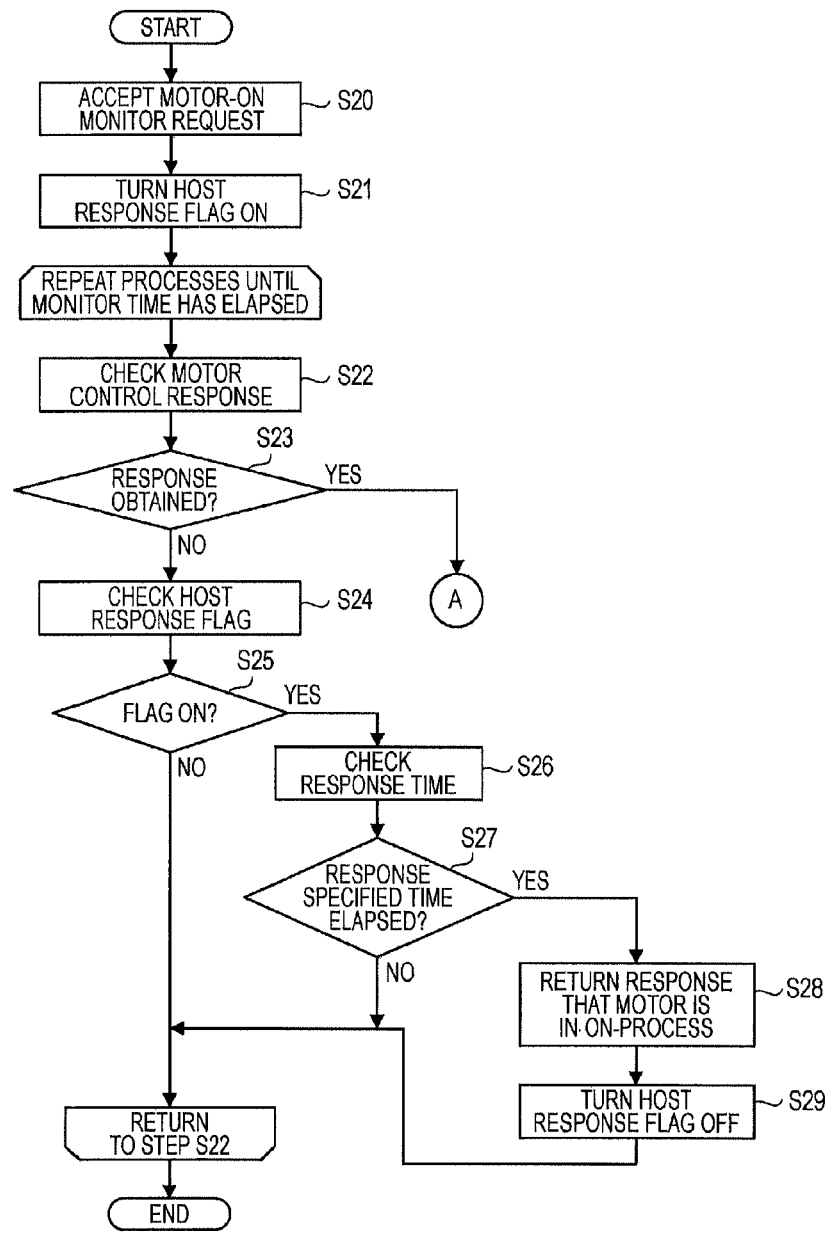
FIG. 10 is a flowchart illustrating the general procedure of a motor-turning-on monitoring process.

FIG. 10 is a flowchart illustrating the general procedure of the process of monitoring turning-on of the motor concerned.

[S20] The access monitoring unit 130 accepts a motor-on monitor request (a request that turning-on of the motor concerned be monitored) and starts execution of a process of monitoring the operating state of the motor of the object disk.

[S21] A host response flag is turned "On". A storage area is prepared in the storage unit 110 for the host response flag and information indicating that the response to the host is "necessary (On)" or "unnecessary (Off)" is stored in the storage area. In the case that the disk motor concerned is turned on based on the access request from the host, "On" is set. In the setting operation, information on the response to an I/O command received from the host 300 and a monitoring start time are set together with the host response flag.

Next, the processes at steps S22 to S29 are repetitively executed until a fixed monitoring time elapses.

[S22] Whether a monitor control response to be given at the completion of control of the motor has been given from the power operation control unit 140 is checked.

[S23] Whether the motor control response has been acquired is judged on the basis of a result of checking of the response at S22. In the case that the motor control response is not acquired, the process proceeds to S24. In the case that the motor control response is acquired, the process proceeds, passing through a branch point A, to step for processing to be executed in accordance with the procedure illustrated in FIG. 11 after execution of the motor tuning-on process.

[S24] In the case that it has been judged that the motor control response is not acquired as the result of checking of the response at S22, the host response flag is checked. If the response to the host is not yet transmitted, the host response flag will be held "On".

[S25] Whether the host response flag which has been checked at S24 is "On" is judged. In the case that the flag is "On", the process proceeds to S26. In the case that the flag is not "On", the process returns to S22 to repeat the motor control response checking process and succeeding processes in accordance with the procedure.

[S26] In the case that it has been judged that the host response flag is "On", a device response time is checked. The device response time is calculated as a time which has elapsed from the monitoring start time set at S21.

[S27] The device response time obtained in the process at S26 is compared with a response specified time to judge whether the response specified time has elapsed. The response specified time is calculated on the basis of the abort time when the control flag of the information on the corresponding host in the connected host information 1110 is "On". In the above mentioned case, a value which is lower than a value indicative of the abort time is set as the value indicative of the response specified time. In the case that the control flag is "Off", the response specified time is calculated on the basis of the device response time. In the case that it has been judged that the response specified time has elapsed by comparing the response specified time which has been calculated in the above mentioned manner with the device response time, the process proceeds to S28. In the case that it has been judged that the response specified time does not elapse, the process returns to S22 to repeat the motor control response checking process and succeeding processes in accordance with the procedure.

[S28] In the case that it has been judged that the response specified time has elapsed from the monitoring start time, a response that the motor of the object disk is in the "in-on-process" state is returned to the host 300 as the I/O command transmit source.

[S29] After the response that the motor of the object disk is in the "in-on-process" state has been transmitted to the host 300, the host response flag is set "Off" and the process returns to S22.

Figure 11:
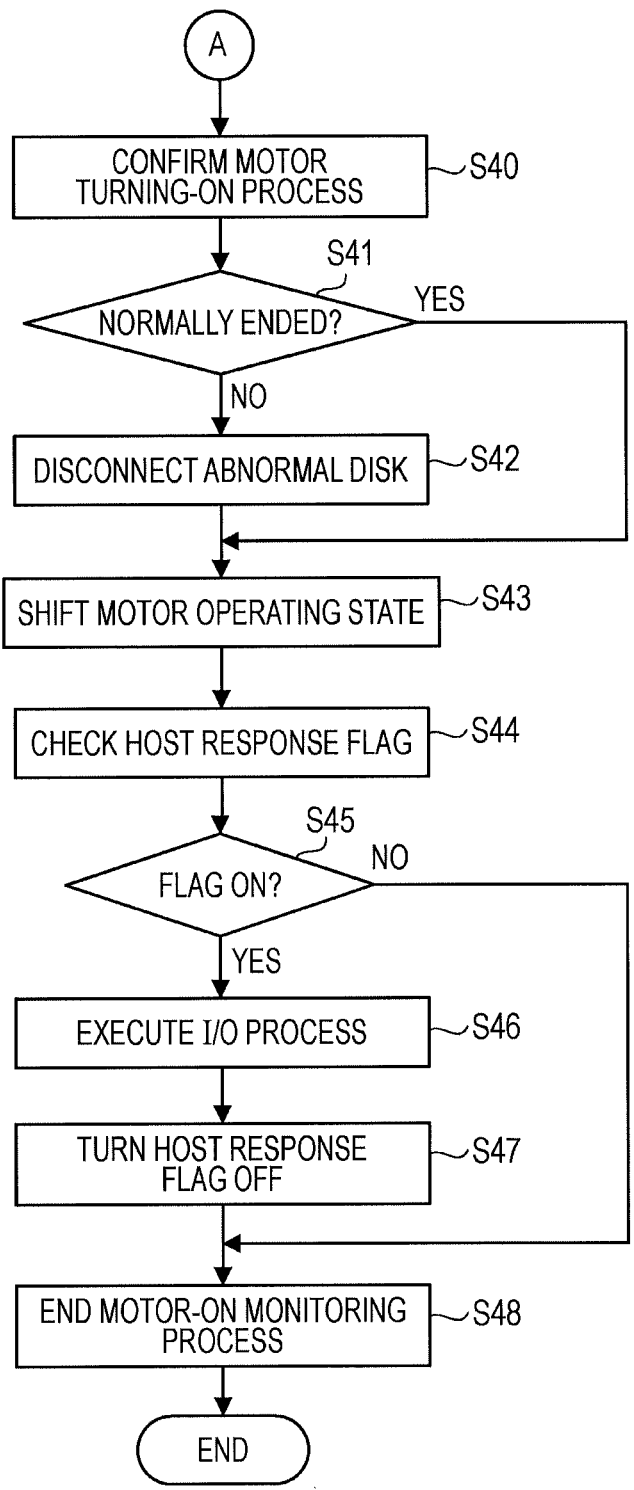
FIG. 11 is a flowchart illustrating the procedure of processing executed after execution of a motor-turning-on process in the motor turning-on monitoring process has been terminated.

FIG. 11 is a flowchart illustrating the procedure of the processing executed at the completion of the motor turning-on process in the motor turning-on monitoring process.

It has been judged that the motor control response has been acquired from the power operation control unit 140 and the processing is started.

[S40] A result of execution of the motor turning-on process is confirmed on the basis of the motor control response. Information on whether execution of the motor turning-on process has been normally terminated is set in the motor control response.

[S41] Whether execution of the motor turning-on process has been normally terminated is judged on the basis of the confirmation executed at S40. In the case that execution of the process has not been normally terminated, the process proceeds to S42. In the case that execution of the process has been normally terminated, the process proceeds to S43.

[S42] In the case that execution of the motor turning-on process has not been normally terminated, a process of disconnecting an abnormal disk to disconnect a disk which is regarded to be abnormal from the RAID group is executed.

[S43] After execution of the motor turning-on process has been normally terminated or the abnormal disk has been disconnected from the RAID group, the operating state of the motor of the object disk in the object RAID group is shifted to the "on" state. When the operating state of the motor of the object disk is once shifted to the "On" state, execution of the I/O process on the object disk will be made possible.

[S44] The host response flag is checked. If the response is not yet transmitted to the host, the host response flag will be held "On".

[S45] Whether the host response flag which has been checked at S44 is "On" is judged. In the case that the flag is "On", the process proceeds to S46. In the case that the flag is not "On", the process proceeds to S48.

[S46] In the case that it has been judged that the host response flag is "On", the I/O process is executed on the object disk on the basis of the I/O command received from the host. Then, a response that the I/O process has been executed is returned to the host 300 as the I/O command transmit source.

[S47] Since the response has been returned to the host, the host response flag is set "Off".

[S48] Execution of the motor tuning-on monitoring process is terminated.

The motor turning-on process to turn on the motor which is in the "off" state of the object disk which is to be subjected to the I/O process is monitored by executing the processes in accordance with the above mentioned procedure. In the case that the motor is not turned on even when the response specified time has elapsed, the response that the motor concerned is in the in-on-process state is returned to the host 300. Owing to the above mentioned operations, such a serious situation may be avoided that the host 300 erroneously regards the disk in the object RAID group to be abnormal.

Incidentally, the above mentioned processing functions may be implemented using a computer. In the above mentioned case, a program in which contents to be processed of processing functions that the storage control device has to have are described is prepared. The above mentioned processing functions are implemented via the computer by executing the program using the computer. The program in which the contents to be processed are described may be stored in a computer readable recording medium.

In the case that the program so prepared is to be distributed, a portable recoding medium in which the program is recorded, for example, such as a DVD (Digital Versatile Disc), a CD-ROM (Compact Disc Read Only Memory) or the like is marketed. In addition, it is also possible to store the program in a storage device of a server computer so as to transfer the program from the server computer to another computer over a network.

A computer that executes the program stores the program which is recorded in the portable recording medium or the program which has been transferred from the server computer in a storage device installed therein. The computer then reads the program out of the storage device installed therein and executes the process in accordance with the program. It is also possible for the computer to read the program directly out of the portable recording medium to execute the process in accordance with the program. It is further possible for the computer to execute a process in accordance with a received program as the case may be every time the program is transferred from the server computer.

According to the storage control device and the method of controlling the operation of the storage device which have been disclosed as mentioned above, the time taken until a response to an access request that access be gained to a storage device which is in a power-saving state is sent is reduced in accordance with an access abort time which is set for access from a host device. Owing to the above mentioned operation, the response is transmitted to the host device before the host device breaks the access to the storage device. Accordingly, the storage device is not erroneously regarded to be abnormal and hence power saving operation of the storage device which is reduced in adverse effect on the operation of a system concerned is made possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage control apparatus comprising:
a controller to receive an access command from a host computer and to control an access to a storage device capable of operating in one of a power saving state and a normal state; and
a monitoring period obtaining section to measure a first timeout period from receiving the access command to receiving a first abort command corresponding to the access command from the host computer and to obtain a monitoring period corresponding to the access command by subtracting a predetermined period from the measured first timeout period obtaining section, and the monitoring period obtaining section measuring a second timeout period from receiving the access command to receiving a second abort command corresponding to the access command from the host computer and updating the monitoring period by subtracting the predetermined period from the measured second timeout period when the monitoring period obtaining section receives the second abort command before the monitoring period that is obtained from the first timeout period elapses from receiving the access command,
wherein the controller causes the storage device to return from the power-saving state to the normal state when the storage device corresponding to the access command is in the power saving state, and the controller makes another attempt to return the storage device to the normal state before occurrence of a timeout by sending the host computer a response indicating that a turning-on process of a motor of the storage device is being executed and preventing a timeout of the host computer corresponding to the access command when the storage device has not yet returned to the normal state after the monitoring period elapses from receiving the access command.

2. The storage control apparatus according to claim 1, wherein the controller receives a plurality of access commands from a plurality of host computers, and the monitoring period obtaining section generates information of the connected host computers and obtains a plurality of monitoring periods each in reference to information of the connected host computers.

3. The storage control apparatus according to claim 1, wherein the controller compares the monitoring period with a return period for returning from the power-saving state to the normal state in the storage device, enables monitoring the monitoring period and sending the response when the monitoring period is longer than the return period, and disables monitoring the monitoring period and sending the response when the monitoring period is shorter than the return period.

4. The storage control apparatus according to claim 1, comprising:

a power state scheduling section to generate a power state schedule to set the power saving state and the normal state to the storage device; and a power state controller section to control the power state of the storage device according to the power state schedule.

5. The storage control apparatus according to claim 4, wherein a power state controller section controls a spindle motor of the storage device to rotate during the normal state and controls the spindle motor not to rotate during the power saving state.

6. A method of controlling a power saving operation of a storage device, the method comprising:

receiving an access command from a host computer and controlling an access to the storage device;

measuring a first timeout period from receiving the access command to receiving from the host computer a first abort command to the access command;

obtaining a monitoring period corresponding to the access command by subtracting a predetermined period from the measured first timeout period;

measuring a second timeout period from receiving the access command to receiving from the host computer a second abort command corresponding to the access command upon receiving the second abort command before the monitoring period that is obtained from the first timeout period elapses from receiving the access command;

updating the monitoring period by subtracting the predetermined period from the measured second timeout period;

returning the storage device from a power-saving state to a normal state when the storage device corresponding to the access command is in the power saving state; and making another attempt to return the storage device to the normal state before occurrence of a timeout by sending the host computer a response indicating that a turning-on process of a motor of the storage device is being executed and preventing a timeout of the host computer corresponding to the access command when the storage device has not yet returned to the normal state after the monitoring period elapses from receiving the access command.

7. A non-transitory computer-readable medium storing a computer program for a storage control apparatus to execute a process controlling a power saving operation of a storage device, the process comprising:

receiving an access command from a host computer and controlling an access to the storage device;

measuring a first timeout period from receiving the access command to receiving from the host computer a first abort command to the access command;

obtaining a monitoring period corresponding to the access command by subtracting a predetermined period from the measured first timeout period;

measuring a second timeout period from receiving the access command to receiving from the host computer a second abort command corresponding to the access command upon receiving the second abort command before the monitoring period that is obtained from the first timeout period elapses from receiving the access command;

updating the monitoring period by subtracting the predetermined period from the measured second timeout period;

returning the storage device from a power-saving state to a normal state when the storage device corresponding to the access command is in the power saving state; and making another attempt to return the storage device to the normal state before occurrence of a timeout by sending the host computer a response indicating that a turning-on process of a motor of the storage device is being executed and preventing a timeout of the host computer corresponding to the access command when the storage device has not yet returned to the normal state after the monitoring period elapses from receiving the access command.

8. The storage control apparatus according to claim 1, wherein the controller selectively controls the timing of a retry attempt corresponding with the monitoring period.

9. The method according to claim 6, wherein the controller selectively controls the timing of a retry attempt corresponding with the monitoring period.

10. The non-transitory computer-readable medium according to claim 7, wherein the controller selectively controls the timing of a retry attempt corresponding with the monitoring period.

* * * * *